United States Patent
Yanagisawa

(10) Patent No.: US 11,378,763 B2
(45) Date of Patent: Jul. 5, 2022

(54) OPTICAL WAVEGUIDE HAVING SUPPORT MEMBER, OPTICAL WAVEGUIDE MOUNTING SUBSTRATE AND OPTICAL TRANSCEIVER

(71) Applicant: SHINKO ELECTRIC INDUSTRIES CO., LTD., Nagano (JP)

(72) Inventor: Kenji Yanagisawa, Nagano (JP)

(73) Assignee: SHINKO ELECTRIC INDUSTRIES CO., LTD., Nagano (JP)

( * ) Notice: Subject to any disclaimer, the term of this patent is extended or adjusted under 35 U.S.C. 154(b) by 0 days.

(21) Appl. No.: 17/155,289

(22) Filed: Jan. 22, 2021

(65) Prior Publication Data

US 2021/0141151 A1 May 13, 2021

Related U.S. Application Data

(62) Division of application No. 16/411,656, filed on May 14, 2019, now Pat. No. 10,935,719.

(30) Foreign Application Priority Data

May 18, 2018 (JP) .............................. JP2018-095993

(51) Int. Cl.
*G02B 6/42* (2006.01)
*G02B 6/12* (2006.01)
(Continued)

(52) U.S. Cl.
CPC ....... *G02B 6/4246* (2013.01); *G02B 6/12004* (2013.01); *G02B 6/4214* (2013.01);
(Continued)

(58) Field of Classification Search
CPC ............ G02B 6/02361; G02B 6/03638; G02B 6/12004; G02B 6/4214; G02B 6/423;
(Continued)

(56) References Cited

U.S. PATENT DOCUMENTS 6,438,281 B1   8/2002 Tsukamoto
6,477,296 B1 * 11/2002 Ogawa ................. G02B 6/4246
                                                                   385/31
(Continued)

FOREIGN PATENT DOCUMENTS

JP    2003-294965       10/2003
JP    2006-330066 A     12/2006
(Continued)

OTHER PUBLICATIONS

Japanese Office Action with English translation dated Nov. 16, 2021, 8 pages.

(Continued)

*Primary Examiner* — Ryan A Lepisto
(74) *Attorney, Agent, or Firm* — Rankin, Hill & Clark LLP

(57) ABSTRACT

An optical waveguide is formed on a support member. A second cladding layer is formed on a surface of a first cladding layer so as to cover a core layer. An opening is opened at the second cladding layer-side, penetrates the second cladding layer and the core layer, and closed at the first cladding layer-side. The opening has a first surface and a second surface ranging from the opened side to the closed side. In a vertical section taken along a longitudinal direction of the core layer, a first angle between a perpendicular line drawn from an opening end of the first surface to the surface of the first cladding layer and the first surface, and a second angle between a perpendicular line drawn from an opening end of the second surface to the surface of the first cladding layer and the second surface are all acute angles.

4 Claims, 8 Drawing Sheets

(51) Int. Cl.
*G02B 6/02* (2006.01)
*G02B 6/036* (2006.01)

(52) U.S. Cl.
CPC ...... *G02B 6/02361* (2013.01); *G02B 6/03638* (2013.01); *G02B 6/423* (2013.01); *G02B 6/4262* (2013.01); *G02B 2006/12176* (2013.01); *G02B 2006/12178* (2013.01)

(58) Field of Classification Search
CPC ........ G02B 6/4246; G02B 2006/12176; G02B 2006/12178
See application file for complete search history.

(56) References Cited

U.S. PATENT DOCUMENTS

| | | | |
|---|---|---|---|
| 6,739,761 | B2 | 5/2004 | Tsukamoto |
| 7,164,815 | B2 | 1/2007 | Yanagisawa |
| 7,596,289 | B2 | 9/2009 | Yamamoto |
| 7,627,210 | B2 | 12/2009 | Yanagisawa |
| 7,865,052 | B2 * | 1/2011 | Yonekura ................. G02B 6/43 385/129 |
| 8,369,675 | B2 | 2/2013 | Yanagisawa |
| 10,025,044 | B1 | 7/2018 | Masuda |
| 10,168,495 | B1 | 1/2019 | Sagara |
| 2008/0285911 | A1 | 11/2008 | Yamamoto et al. |
| 2009/0245720 | A1 | 10/2009 | Choki et al. |
| 2009/0245726 | A1 | 10/2009 | Yonekura et al. |
| 2010/0142904 | A1 | 6/2010 | Yanagisawa |
| 2010/0226606 | A1 | 9/2010 | Choki |
| 2012/0134632 | A1 | 5/2012 | Yamamoto et al. |
| 2016/0187582 | A1 | 6/2016 | Yanagisawa |
| 2017/0146741 | A1 | 5/2017 | Horibe et al. |

FOREIGN PATENT DOCUMENTS

| | | |
|---|---|---|
| JP | 2008-281923 | 11/2008 |
| JP | 2009-251034 | 10/2009 |
| JP | 2010-139562 | 6/2010 |
| JP | 2012-113180 A | 6/2012 |
| JP | 2016-126039 A | 7/2016 |
| KR | 2010-0035933 | 4/2010 |
| WO | 2007/139155 | 12/2007 |

OTHER PUBLICATIONS

Japanese Office Action dated Apr. 12, 2022, English translation included, 12 pages.

* cited by examiner

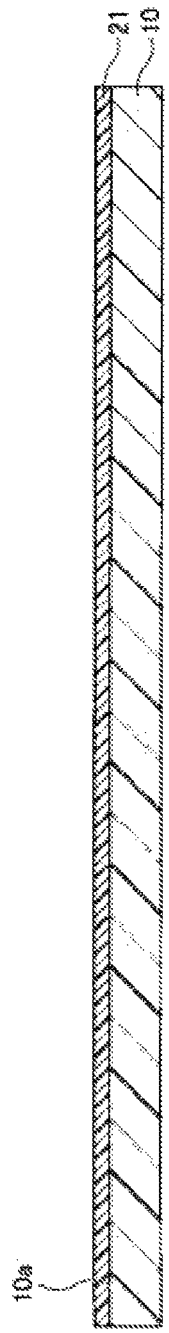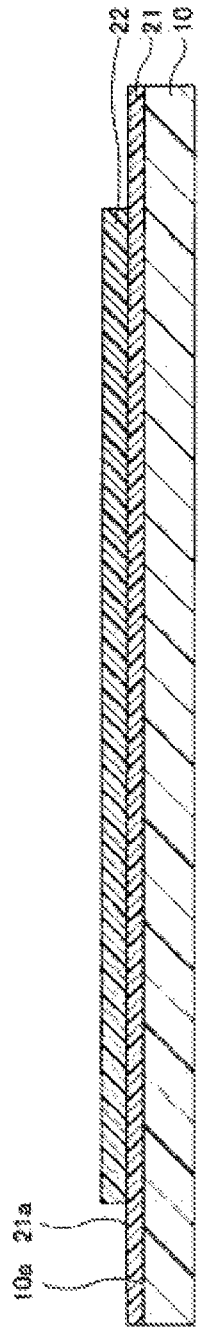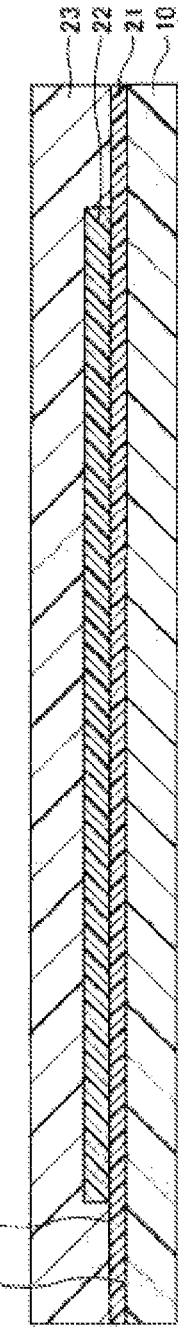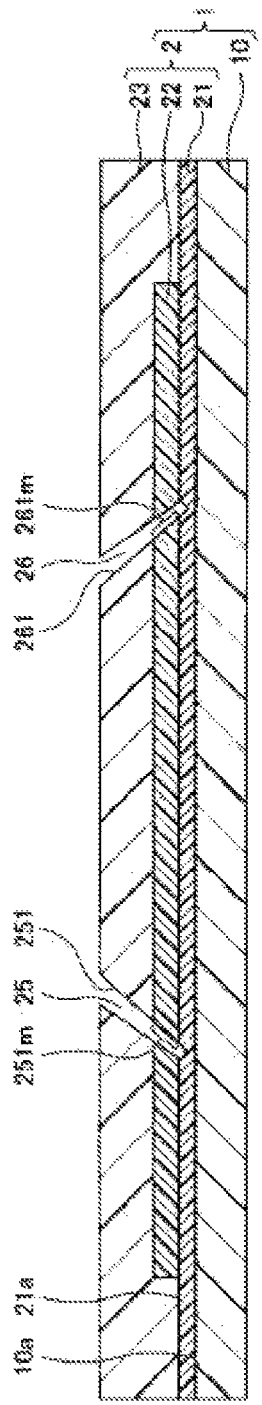
FIG. 3A
FIG. 3B
FIG. 3C
FIG. 3D ately flattened. The cladding layer so as to cover a periphery of the core layer and being thicker than the first cladding layer, and an opening opened at the second cladding layer-side, penetrating the second cladding layer and the core layer, and closed at the first cladding layer-side, and

OPTICAL WAVEGUIDE HAVING SUPPORT MEMBER, OPTICAL WAVEGUIDE MOUNTING SUBSTRATE AND OPTICAL TRANSCEIVER

CROSS-REFERENCE TO RELATED APPLICATIONS

This application is based upon and claims the benefit of priority from prior Japanese patent application No. 2018-095993 filed on May 18, 2018, the entire contents of which are incorporated herein by reference. This application is also a divisional application of parent U.S. application Ser. No. 16/411,656, filed May 14, 2019, the entire contents of which are incorporated herein by reference.

TECHNICAL FIELD

The present disclosure relates to an optical waveguide having a support member, an optical waveguide mounting substrate, and an optical transceiver.

RELATED ART

In an optical waveguide where a core layer is sandwiched by a first cladding layer and a second cladding layer, a technology has been known in which an opening (space) having an isosceles right angle-shaped section is provided from one side of the optical waveguide, so that an inclined surface, which is inclined by about 45° relative to a light propagation direction of the core layer, is formed. The inclined surface is a total reflection surface configured to convert a propagation direction of light to be propagated along the core layer into about a right angle.

Patent Document 1: WO2007/139155

Meanwhile, in the optical waveguide, the optical waveguide may be mounted on a wiring substrate with an adhesive layer being interposed therebetween in a state where an opened side of the isosceles right angle-shaped opening is made to face toward the adhesive layer. A width of the isosceles right angle-shaped opening is wide at the opened side, so that contaminants such as remnant of the adhesive layer, wastes and the like are likely to enter the opening. For this reason, the contaminants are attached to a reflection surface in the opening, so that reflection characteristics are deteriorated.

SUMMARY OF INVENTION

Aspect of non-limiting embodiments of the present disclosure relates to provide an optical waveguide having a support member, an optical waveguide mounting substrate, and an optical transceiver, which can reduce concerns that contaminants will be introduced into an opening provided to the optical waveguide.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an optical waveguide having a support member comprising:

a support member; and
an optical waveguide formed on the support member, wherein the optical waveguide comprises:
a first cladding layer formed on a surface of the support member,
a core layer formed on a surface of the first cladding layer,
a second cladding layer formed on the surface of the first cladding layer so as to cover a periphery of the core layer and being thicker than the first cladding layer, and
an opening opened at the second cladding layer-side, penetrating the second cladding layer and the core layer, and closed at the first cladding layer-side, and wherein the opening has a first surface and a second surface ranging from the opened side to the closed side, and in a vertical section taken along a longitudinal direction of the core layer, a first angle between a perpendicular line drawn from an opening end of the first surface to the surface of the first cladding layer and the first surface, and a second angle between a perpendicular line drawn from an opening end of the second surface to the surface of the first cladding layer and the second surface are all acute angles.

According to the present disclosure, it is possible to reduce concerns that contaminants will be introduced into the opening provided to the optical waveguide.

BRIEF DESCRIPTION OF DRAWINGS

Exemplary embodiments of the present disclosure will be described in detail based on the following figures, wherein:

FIGS. 3A to 3D are views illustrating manufacturing processes of the optical waveguide having a support member according to the first exemplary embodiment;

DESCRIPTION OF EMBODIMENTS

Figure 1A:
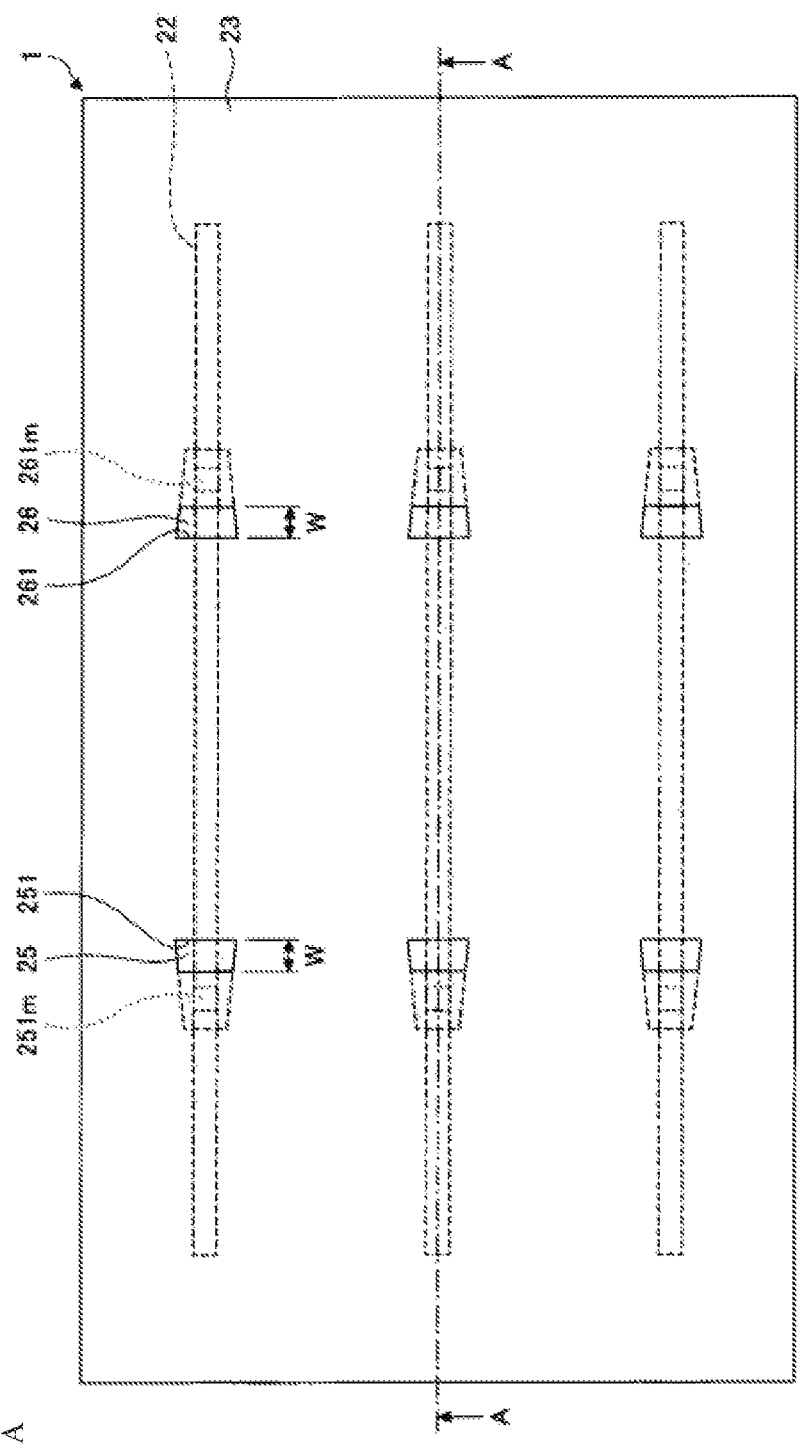
FIGS. 1A and 1B are views illustrating an optical waveguide having a support member according to a first exemplary embodiment.

Hereinafter, exemplary embodiments of the present disclosure will be described with reference to the drawings. In the meantime, in the drawings, the same constitutional parts are denoted with the same reference numerals, and the overlapping descriptions thereof may be omitted.

First Exemplary Embodiment

[Structure of Optical Waveguide Having Support Member According to First Exemplary Embodiment]

Figure 1B:
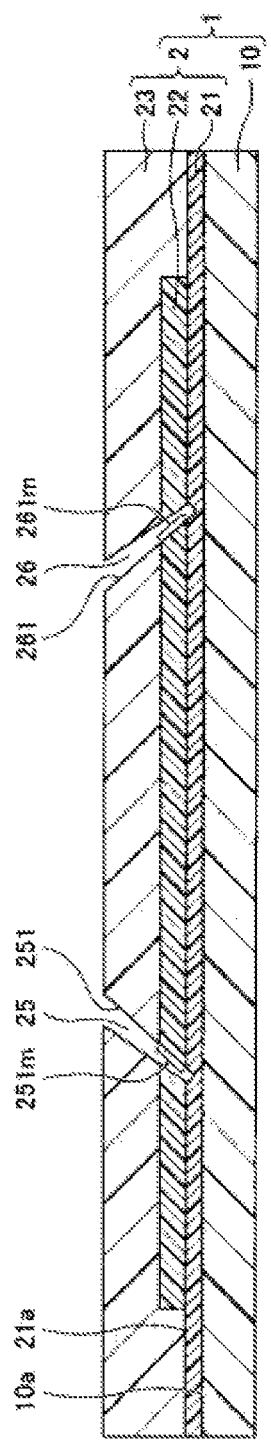
Figure 2:
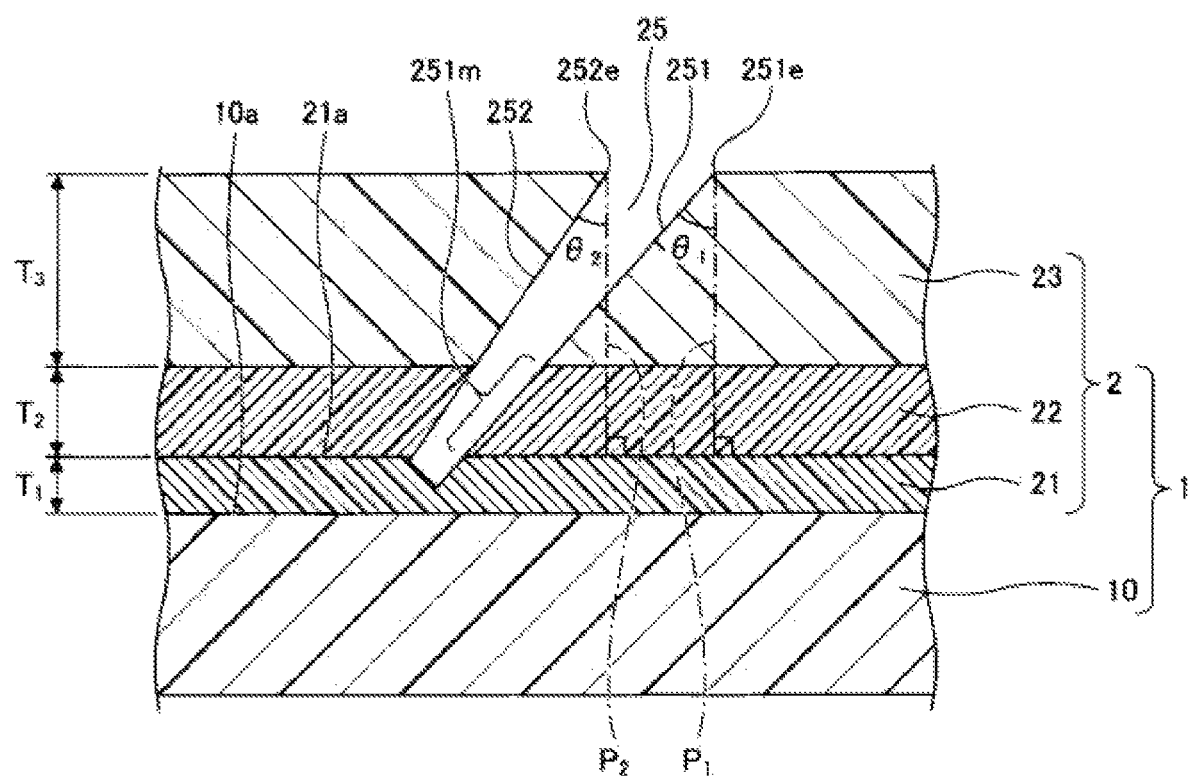
FIG. 2 is a partially enlarged sectional view in the vicinity of an opening 25 of FIG. 1B.

First, a structure of an optical waveguide having a support member according to a first exemplary embodiment is described. FIGS. 1A and 1B are views illustrating an optical waveguide having a support member according to the first exemplary embodiment. FIG. 1A is a plan view. FIG. 1B is a sectional view taken along a line A-A of FIG. 1A, depicting a longitudinal section taken along a longitudinal direction of a core layer 22 (a section taken along a direction perpendicular to one surface 10a of a support member 10). FIG. 2 is a partially enlarged sectional view in the vicinity of an opening 25 of FIG. 1B.

Referring to FIG. 1B, an optical waveguide 1 having a support member includes a support member 10, and an optical waveguide 2 formed on the support member 10. Referring to FIGS. 1B and 2, the optical waveguide 2 has a first cladding layer 21, core layers 22, a second cladding layer 23, and openings 25, 26.

The support member 10 is a base member for forming the optical waveguide 2 having the first cladding layer 21, the core layers 22 and the second cladding layer 23, and for example, may be formed by a resin substrate made of polycarbonate or the like. The support member 10 may be formed by a glass substrate, a silicon substrate or the like, too. A thickness of the support member 10 may be set to about 200 to 500 µm, for example.

The first cladding layer 21 is formed on one surface 10a of the support member 10. The first cladding layer 21 may be formed of a polyimide-based resin, an acryl-based resin, an epoxy-based resin, a polyolefin-based resin, a polynorbornene-based resin, or the like, for example. A thickness T1 of the first cladding layer 21 may be set to about 10 to 30 µm, for example.

The core layers 22 are selectively formed on one surface 21a of the first cladding layer 21. In the example of FIG. 1A, three elongated core layers 22 are arranged on one surface 21a of the first cladding layer 21. This is just exemplary. That is, one, two or four or more core layers 22 may be formed. A pitch of the adjacent core layers 22 may be set to about 200 to 300 µm, for example. The core layer 22 may be formed of the same material as the first cladding layer 21. A thickness T2 of the core layer 22 may be set to 25 to 35 µm, for example. A sectional shape of the core layer 22 in a width direction may be a square, for example.

The second cladding layer 23 is formed on one surface 21a of the first cladding layer 21 so as to cover peripheries of the core layers 22. The second cladding layer 23 may be formed of the same material as the first cladding layer 21. A thickness T3 of the second cladding layer 23 is larger than the thickness T1 of the first cladding layer 21. The thickness T3 of the second cladding layer 23 may be set to be equal to or more than a value (T1+15 µm) obtained by adding 15 µm to the thickness T1 of the first cladding layer 21, for example. In the meantime, the thickness T3 of the second cladding layer 23 indicates a thickness of an upper part of the second cladding layer 23 above an upper surface of the core layer 22.

As described above, the first cladding layer 21, the core layer 22, and the second cladding layer 23 may be formed of the same material. A refractive index of the core layer 22 is required to be set higher than refractive indexes of the first cladding layer 21 and the second cladding layer 23. When an additive for refractive index control such as Ge is added to the core layer 22, it is possible to make the refractive index of the core layer 22 larger than the refractive indexes of the first cladding layer 21 and the second cladding layer 23. The refractive indexes of the first cladding layer 21 and the second cladding layer 23 may be set to 1.5, and the refractive index of the core layer 22 may be set to 1.6, for example.

The optical waveguide 1 having a support member is formed with the openings 25, 26 opened at the second cladding layer 23-side, penetrating the second cladding layer 23 and the core layers 22, and closed at the first cladding layer 21-side. A width W of each of the openings 25, 26 may be set to about 30 to 80 µm, for example.

As shown in FIG. 2, the opening 25 has a wedge-shaped section of which a width gradually decreases from the second cladding layer 23 toward the core layer 22. The opening 25 has a first surface 251 and a second surface 252 ranging from the opened side to the closed side, and the first surface 251 and the second surface 252 substantially face each other.

An angle between a perpendicular line P1 drawn from an opening end 251e of the first surface 251 to one surface 21a of the first cladding layer 21 and the first surface 251 is denoted as $\theta_1$. Also, an angle between a perpendicular line P2 drawn from an opening end 252e of the second surface 252 to one surface 21a of the first cladding layer 21 and the second surface 252 is denoted as $\theta_2$. In this case, the angle $\theta_1$ and the angle $\theta_2$ are all acute angles. The acute angle is an angle which is less than 90 degrees (90°) but more than 0 degrees (0°).

The angle $\theta_1$ is, for example, 45°±1°, and a portion 251m of the first surface 251 belonging to the core layer 22 is a reflection surface (hereinafter, also referred to as 'reflection surface 251m') on which a propagation direction of incident light is to be converted. The angle $\theta_2$ is, for example, 31°±1°. An absolute value of a difference between the angle $\theta_1$ and the angle $\theta_2$ is, for example, 14±1°.

Although not shown in detail, the opening 26 has a line-symmetric shape to the opening 25 with respect to the perpendicular lines P1, P2. Therefore, values of the angle $\theta_1$ and the angle $\theta_2$ are the same as the opening 25. A portion 261m of the first surface 261 belonging to the core layer 22 is a reflection surface (hereinafter, also referred to as 'reflection surface 261m') on which a propagation direction of incident light is to be converted.

Meanwhile, in the subject application, a shape where a wedge angle (absolute value of a difference between the angle $\theta_1$ and the angle $\theta_2$) is equal to or smaller than 40° is referred to as a wedge-shaped section. That is, the isosceles right angle-shaped section (the wedge angle is 45°) is not included in the wedge-shaped section of the subject application.

[Manufacturing Method of Optical Waveguide Having Support Member According to First Exemplary Embodiment]

Subsequently, a manufacturing method of the optical waveguide having a support member according to the first exemplary embodiment is described. FIGS. 3A to 3D are views illustrating manufacturing processes of the optical waveguide having a support member according to the first exemplary embodiment.

First, in a process of FIG. 3A, the support member 10 is prepared, and the first cladding layer 21 is formed on one surface 10a of the support member 10. The material and thickness of the support member 10 are as described above. The first cladding layer 21 may be formed by applying a liquid or paste resin material to one surface 10a of the support member 10, irradiating the material with ultraviolet, and heating and curing the same, for example. Instead of coating the liquid or paste resin material, a film-shaped resin material may be laminated. The material and thickness of the first cladding layer 21 are as described above.

Then, in a process of FIG. 3B, the core layer 22 is formed on one surface 21a of the first cladding layer 21. The core layer 22 may be formed by applying a liquid or paste resin material to one entire surface 21a of the first cladding layer 21, irradiating the material with ultraviolet, and heating and curing the same, for example. Instead of coating the liquid or paste resin material, a film-shaped resin material may be laminated. The material and thickness of the core layer 22 are as described above.

Then, in a process of FIG. 3C, the second cladding layer 23 is formed on one surface 21a of the first cladding layer 21 so as to cover the core layer 22. Thereby, a periphery of the core layer 22 is covered with the first cladding layer 21 and the second cladding layer 23. The second cladding layer 23 may be formed by the same method as the first cladding layer 21. The material and thickness of the second cladding layer 23 are as described above.

Then, in a process of FIG. 3D, the openings 25, 26 that are opened at the second cladding layer 23-side, penetrate the second cladding layer 23 and the core layer 22 and are closed at the first cladding layer 21-side are formed. Thereby, the optical waveguide 2 in which the first cladding layer 21, the core layer 22, and the second cladding layer 23 are sequentially stacked on one surface 10a of the support member 10 is formed, so that the optical waveguide 1 having a support member is completed.

The openings 25, 26 may be formed by irradiation of laser light. As the laser light, for example, ArF excimer laser (wavelength 193 nm), KrF excimer laser (wavelength 248 nm), XeCl excimer laser (wavelength 308 nm), XeF excimer laser (wavelength 351 nm) and the like may be used. The excimer laser is favorable because it can form one opening by one time irradiation.

In the meantime, when the excimer laser is used, the opening 25 is formed so that an angle between the first surface 251 and the second surface 252 (refer to FIG. 2) is to be about 14°. The opening 26 is also the same. Therefore, when the laser light is irradiated at an angle of about 38° relative to one surface 21a of the first cladding layer 21, the angle $\theta_1$ (refer to FIG. 2) becomes about 45° and the angle $\theta_2$ (refer to FIG. 2) becomes about 31°.

In this way, in the optical waveguide 1 having a support member, the openings 25, 26 are formed using the excimer laser, so that it is possible to accurately form one opening by one time irradiation.

Second Exemplary Embodiment

In a second exemplary embodiment, an example of an optical waveguide mounting substrate on which the optical waveguide of the first exemplary embodiment is mounted is described. In the meantime, in the second exemplary embodiment, the descriptions of the same constitutional parts as the first exemplary embodiment may be omitted.

[Structure of Optical Waveguide Mounting Substrate According to Second Exemplary Embodiment]

Figure 4:
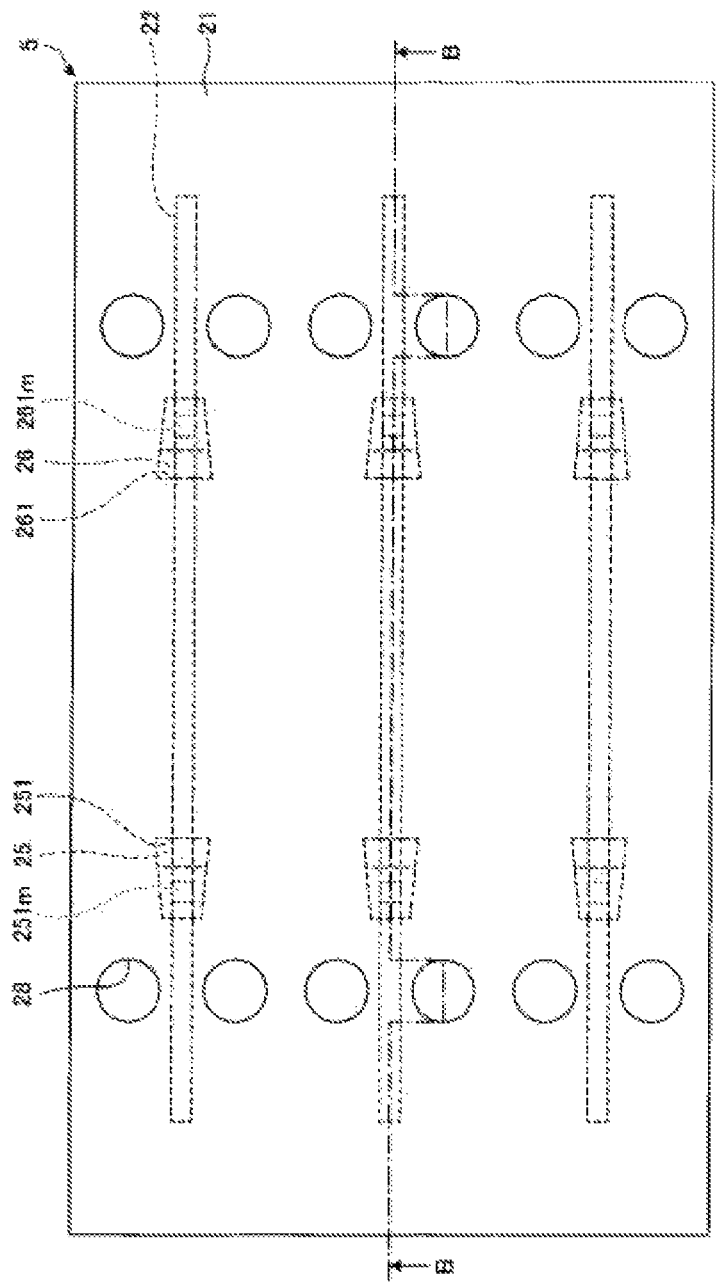
FIG. 4 is a plan view exemplifying an optical waveguide mounting substrate according to a second exemplary embodiment.
Figure 5:
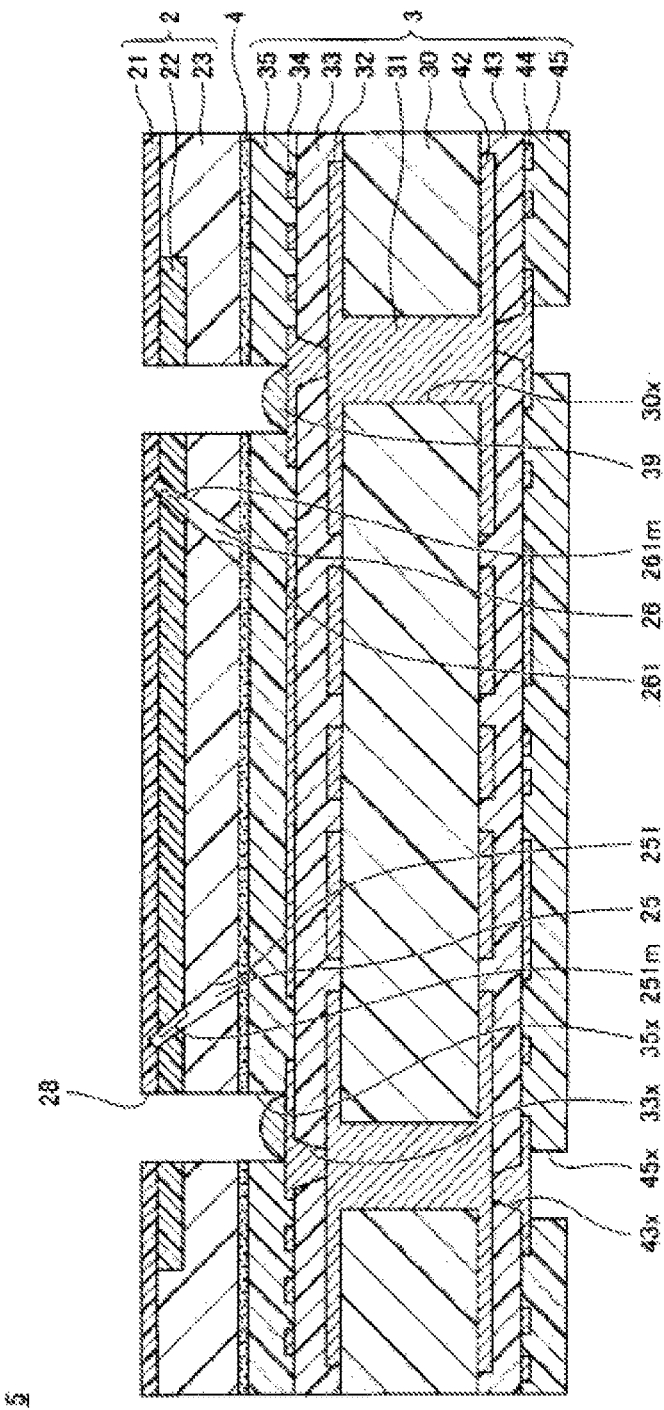
FIG. 5 is a sectional view exemplifying the optical waveguide mounting substrate according to the second exemplary embodiment.

First, a structure of an optical waveguide mounting substrate according to the second exemplary embodiment is described. FIG. 4 is a plan view exemplifying the optical waveguide mounting substrate according to the second exemplary embodiment. FIG. 5 is a sectional view exemplifying the optical waveguide mounting substrate according to the second exemplary embodiment, depicting a section taken along a line B-B of FIG. 4.

Referring to FIGS. 4 and 5, an optical waveguide mounting substrate 5 includes a wiring substrate 3, and the optical waveguide 2 mounted on the wiring substrate 3 with an adhesive layer 4 being interposed therebetween.

In the wiring substrate 3, wiring layers and insulation layers are stacked on both surfaces of a core substrate 30. Specifically, in the wiring substrate 3, a wiring layer 32, an insulation layer 33, a wiring layer 34, and a solder resist layer 35 are sequentially stacked on one surface (upper surface) of the core substrate 30. Also, a wiring layer 42, an insulation layer 43, a wiring layer 44, and a solder resist layer 45 are sequentially stacked on the other surface (lower surface) of the core substrate 30.

As the core substrate 30, for example, a so-called glass epoxy substrate in which an insulating resin such as an epoxy-based resin is impregnated in glass cloth, and the like may be used. As the core substrate 30, a substrate in which an epoxy-based resin, a polyimide-based resin or the like is impregnated in woven fabric or non-woven fabric of glass fiber, carbon fiber, aramid fiber or the like, and the like may also be used. A thickness of the core substrate 30 may be set to about 60 to 400 µm, for example. The core substrate 30 is formed with through-holes 30x penetrating the core substrate 30 in a thickness direction. A planar shape of the through-hole 30x is circular, for example.

The wiring layer 32 is formed on one surface of the core substrate 30. Also, the wiring layer 42 is formed on the other surface of the core substrate 30. The wiring layer 32 and the wiring layer 42 are electrically connected by through-wirings 31 formed in the through-holes 30x. The wiring layers 32, 42 are respectively patterned into a predetermined planar shape. For the wiring layers 32, 42 and the through-wiring 31, copper (Cu) or the like may be used, for example. A thickness of each of the wiring layers 32, 42 may be set to about 10 to 30 µm, for example. In the meantime, the wiring layer 32, the wiring layer 42 and the through-wiring 31 may be integrally formed.

The insulation layer 33 is formed on one surface of the core substrate 30 so as to cover the wiring layer 32. As a material of the insulation layer 33, for example, an insulating resin of which a main component is an epoxy-based resin or a polyimide-based resin, and the like may be used. A thickness of the insulation layer 33 may be set to about 30 to 40 µm, for example. The insulation layer 33 may contain filler such as silica ($SiO_2$).

The wiring layer 34 is formed on one side of the insulation layer 33. The wiring layer 34 includes via wirings filled in via holes 33x penetrating the insulation layer 33 and formed to expose one surface of the wiring layer 32, and a wiring pattern formed on one surface of the insulation layer 33. The wiring layer 34 is electrically connected to the wiring layer 32. The via hole 33x may be formed as a concave portion having an inverted conical shape of which a diameter of an opening opened to the solder resist layer 35-side is larger than a diameter of a bottom surface of an opening formed by one surface of the wiring layer 32. A material of the wiring layer 34 and a thickness of the wiring pattern configuring the wiring layer 34 may be made to be the same as the wiring layer 32, for example.

The solder resist layer 35 is an outermost layer formed at one side of the wiring substrate 3, and is formed on one surface of the insulation layer 33 so as to cover the wiring layer 34. The solder resist layer 35 may be formed of a photosensitive resin such as an epoxy-based resin and an acryl-based resin, and the like. A thickness of the solder resist layer 35 may be set to about 15 to 35 µm, for example.

The solder resist layer 35 has openings 35x, and portions of one surface of the wiring layer 34 are exposed to bottom portions of the openings 35x. A planar shape of the opening 35x may be circular, for example. If necessary, one surface of the wiring layer 34 exposed into the openings 35x may be formed with a metal layer or may be subjected to oxidation prevention processing such as OSP (Organic Solderability Preservative) processing. As the metal layer, an Au layer, a Ni/Au layer (a metal layer having a Ni layer and an Au layer stacked in corresponding order), a Ni/Pd/Au layer (a metal layer having a Ni layer, a Pd layer and an Au layer stacked in corresponding order), and the like may be exemplified.

The insulation layer 43 is formed on the other surface of the core substrate 30 so as to cover the wiring layer 42. A material and a thickness of the insulation layer 43 may be made to be the same as the insulation layer 33, for example. The insulation layer 43 may contain filler such as silica ($SiO_2$). The wiring layer 44 is formed on the other side of the insulation layer 43. The wiring layer 44 includes via wirings filled in via holes 43x penetrating the insulation layer 43 and formed to expose the other surface of the wiring layer 42, and a wiring pattern formed on the other surface of the insulation layer 43. The wiring layer 44 is electrically connected to the wiring layer 42. The via hole 43x may be formed as a concave portion having an inverted conical shape of which a diameter of an opening opened to the solder resist layer 45-side is larger than a diameter of a bottom surface of an opening formed by the other surface of the wiring layer 42. A material and a thickness of the wiring layer 44 may be made to be the same as the wiring layer 32, for example.

The solder resist layer 45 is an outermost layer formed at the other side of the wiring substrate 3, and is formed on the other surface of the insulation layer 43 so as to cover the wiring layer 44. A material and a thickness of the solder resist layer 35 may be made to be the same as the solder resist layer 35, for example. The solder resist layer 45 has openings 45x, and portions of the other surface of the wiring layer 44 are exposed into the openings 45x. A planar shape of the opening 45x may be circular, for example. The wiring layer 44 exposed into the openings 45x may be used as a pad for electrical connection with a mounting substrate (not shown) such as a motherboard. If necessary, the other surface of the wiring layer 44 exposed into the openings 45x may be formed with the above-described metal layer or may be subjected to oxidation prevention processing such as OSP processing.

On the solder resist layer 35 of the wiring substrate 3, the optical waveguide 2 is mounted via the adhesive layer 4. The second cladding layer 23 of the optical waveguide 2 faces the solder resist layer 35 of the wiring substrate 3 via the adhesive layer 4. The optical waveguide 2 is formed with the openings 28 configured to communicate with the openings 35x of the solder resist layer 35. The adhesive layer 4 is a thermosetting epoxy-based adhesive, for example.

One surface of the wiring layer 34 exposed into the openings 35x and the openings 28 to communicate with each other is formed with external connection terminals 39. The external connection terminal 39 is a solder bump, for example. As a material of the solder bump, for example, an alloy including Pb, an alloy of Sn and Cu, an alloy of Sn and Ag, an alloy of Sn, Ag and Cu, and the like may be used. The external connection terminal 39 is a terminal to be electrically connected to a light-emitting element and a light-receiving element.

[Manufacturing Method of Optical Waveguide Mounting Substrate According to Second Exemplary Embodiment]

Subsequently, a manufacturing method of the optical waveguide mounting substrate according to the second exemplary embodiment is described. FIGS. 6A to 7B exemplify manufacturing processes of the optical waveguide mounting substrate according to the second exemplary embodiment. In the meantime, here, an example of the process of manufacturing one optical waveguide mounting substrate is described. However, a plurality of parts becoming the optical waveguide mounting substrate may be manufactured and then individually separated to form each optical waveguide mounting substrate.

Figure 6A:
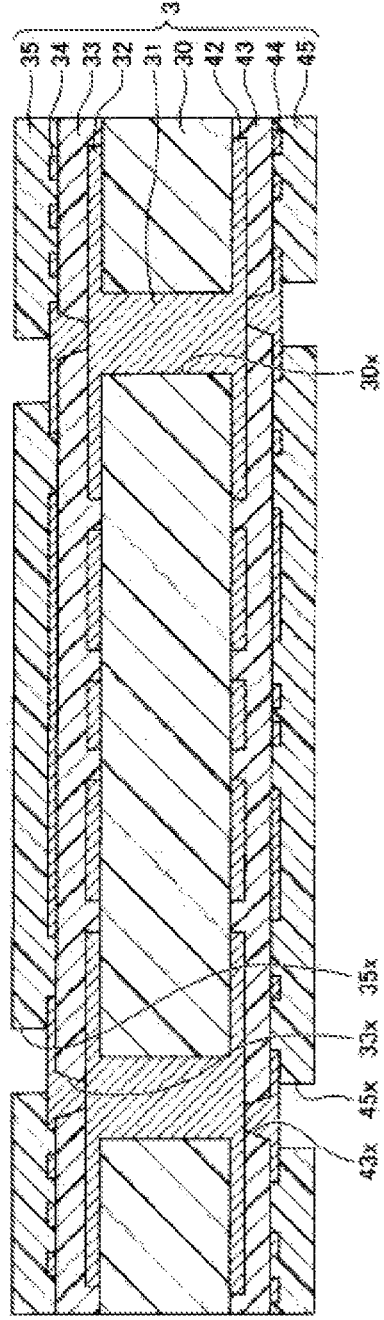
FIGS. 6A and 6B are views illustrating a manufacturing process of the optical waveguide mounting substrate according to the second exemplary embodiment (1 thereof)

First, in a process of FIG. 6A, the wiring substrate 3 is prepared. The wiring substrate 3 may be manufactured using a well-known buildup technology, for example.

Figure 6B:
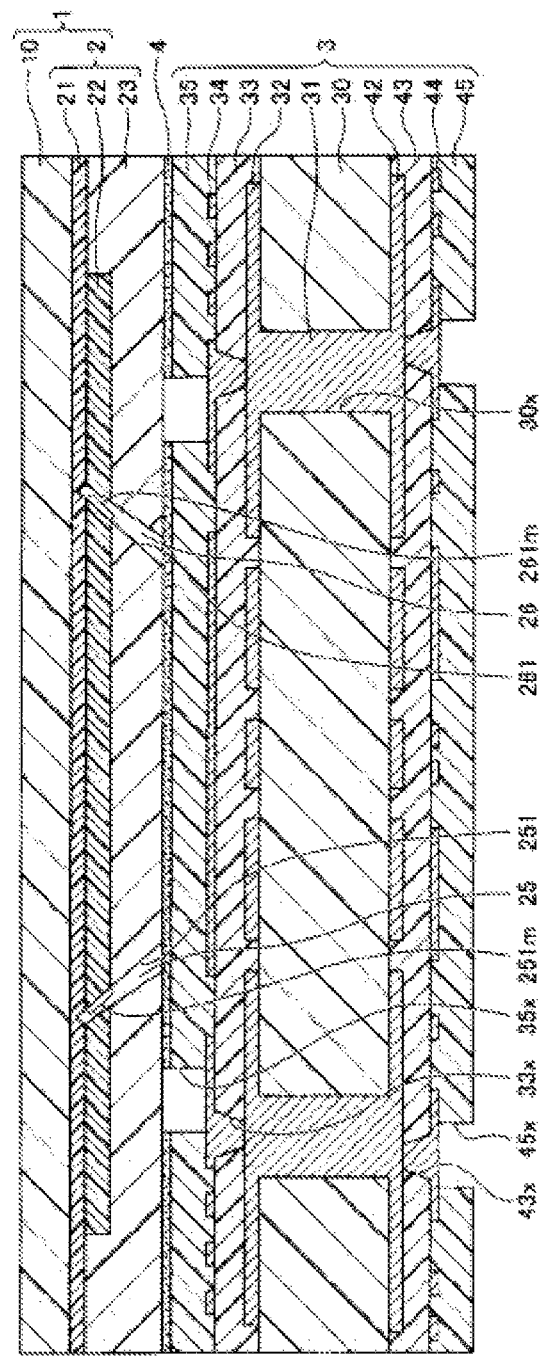

Then, in a process of FIG. 6B, the optical waveguide 1 having a support member is prepared, and the optical waveguide 1 having a support member is mounted on the solder resist layer 35 of the wiring substrate 3 via the adhesive layer 4. In the meantime, the optical waveguide 1 having a support member is mounted so that the second cladding layer 23 of the optical waveguide 2 is to face the solder resist layer 35 of the wiring substrate 3 via the adhesive layer 4.

In this process, the openings 25, 26 are blocked at sides facing toward the second cladding layer 23 by the adhesive layer 4, but a space is formed around the reflection surface 251m in the opening 25. Thereby, the reflection surface 251m can perform an original function of converting a propagation direction of incident light. Likewise, the opening 26 is blocked at a side facing toward the second cladding layer 23 by the adhesive layer 4, but a space is formed around the reflection surface 261m in the opening 26. Thereby, the reflection surface 261m can perform an original function of converting a propagation direction of incident light.

Figure 7A:
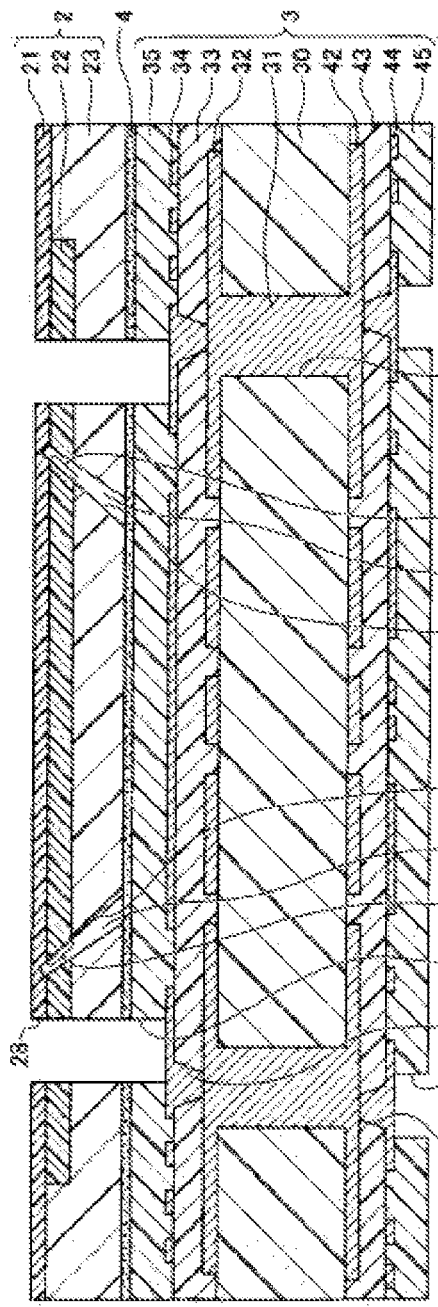
FIGS. 7A and 7B are views illustrating the manufacturing process of the optical waveguide mounting substrate according to the second exemplary embodiment (2 thereof)

Then, in a process of FIG. 7A, the support member 10 is removed, and the optical waveguide 2 is formed with the openings 28 to communicate with the openings 35x of the solder resist layer 35. In the openings 35x and the openings 28 to communicate with each other, one surface of the wiring layer 34 is exposed. The openings 28 may be formed by a laser processing method of using $CO_2$ laser, for example.

Figure 7B:
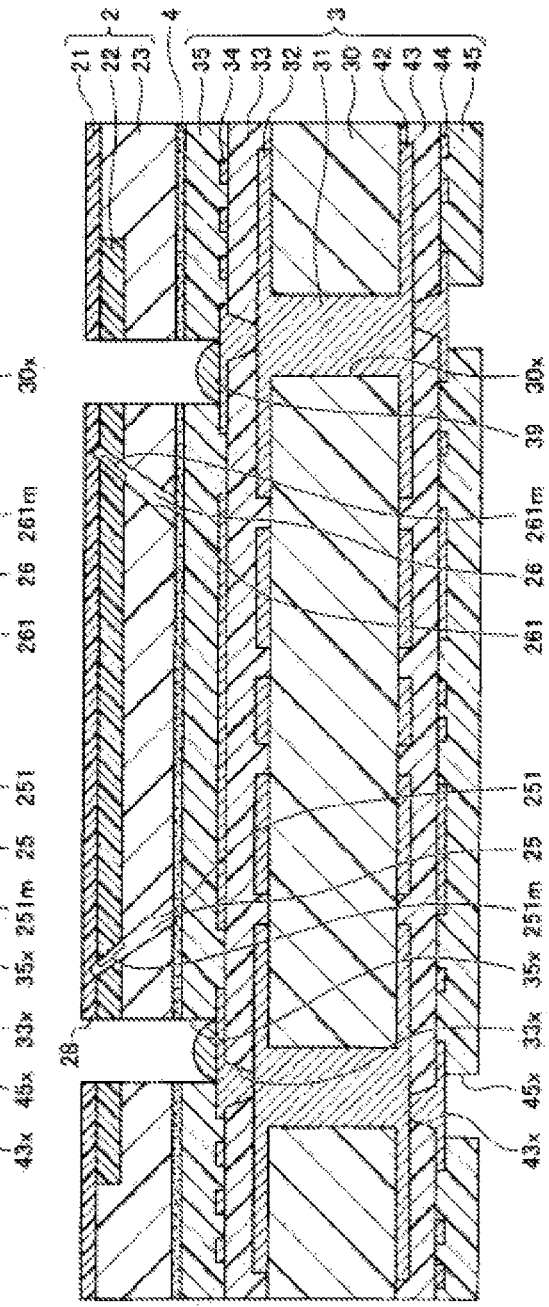

Then, in a process of FIG. 7B, one surface of the wiring layer 34 exposed into the openings 35x and the openings 28 to communicate with each other is formed with the external connection terminals 39. The external connection terminal 39 is a solder bump, for example. The material of the solder bump is as described above. By the above processes, the optical waveguide mounting substrate 5 shown in FIGS. 4 and 5 is completed.

In the meantime, before the process of FIG. 6B, the support member 10 may be removed from the optical waveguide 1 having a support member, and only the optical waveguide 2 from which the support member 10 has been removed may be mounted on the solder resist layer 35 of the wiring substrate 3 with the adhesive layer 4 being interposed therebetween.

Meanwhile, in the related art, the openings corresponding to the openings 25, 26 have an isosceles right angle-shaped section ($\theta_1=45°$, $\theta_2=0°$). Therefore, an opening-side width W of the opening is wide, so that contaminants such as remnant of the adhesive layer 4, wastes and the like are likely to enter the opening. For this reason, the contaminants are attached to the reflection surface in the opening (corresponding to the reflection surface 251m in the opening 25 and the reflection surface 261m in the opening 26), so that reflection characteristics are deteriorated.

In contrast, in the second exemplary embodiment, the openings 25, 26 have a wedge-shaped section, other than the isosceles right angle-shaped section, and an opening-side width W of each of the openings 25, 26 is considerably smaller, as compared to the openings having the isosceles right angle-shaped section. For this reason, for example, in the process of FIG. 6B, the contaminants such as remnant of the adhesive layer 4, wastes and the like are difficult to enter the opening 25 and the opening 26, so that it is possible to reduce the concerns that the reflection characteristics will be deteriorated, which is caused when the contaminants are attached to the reflection surface 251m and the reflection surface 261m.

Also, in the related art, the thicknesses of the first cladding layer and the second cladding layer are generally the same. However, in the second exemplary embodiment, the second cladding layer 23 closer to the adhesive layer 4 is made thicker than the first cladding layer 21. For this reason, as compared to the structure of the related art, it is possible to increase distances between the adhesive layer 4 and the reflection surfaces 251m, 261m, so that it is possible to further reduce the concerns that the remnant of the adhesive layer 4 will be attached to the reflection surfaces 251m, 261m.

Also, in the optical waveguide mounting substrate 5, the openings 25, 26 do not penetrate the first cladding layer 21. For this reason, since the openings 25, 26 do not interfere with the openings 28, it is possible to improve a degree of design freedom of mounting of optical elements (a light-emitting element and a light-receiving element to be described later).

Third Exemplary Embodiment

In a third exemplary embodiment, an example of an optical transceiver where a light-emitting element and a light-receiving element are mounted on the optical waveguide mounting substrate of the second exemplary embodiment is described. Meanwhile, in the third exemplary embodiment, the descriptions of the same constitutional components as the above exemplary embodiments may be omitted.

Figure 8:
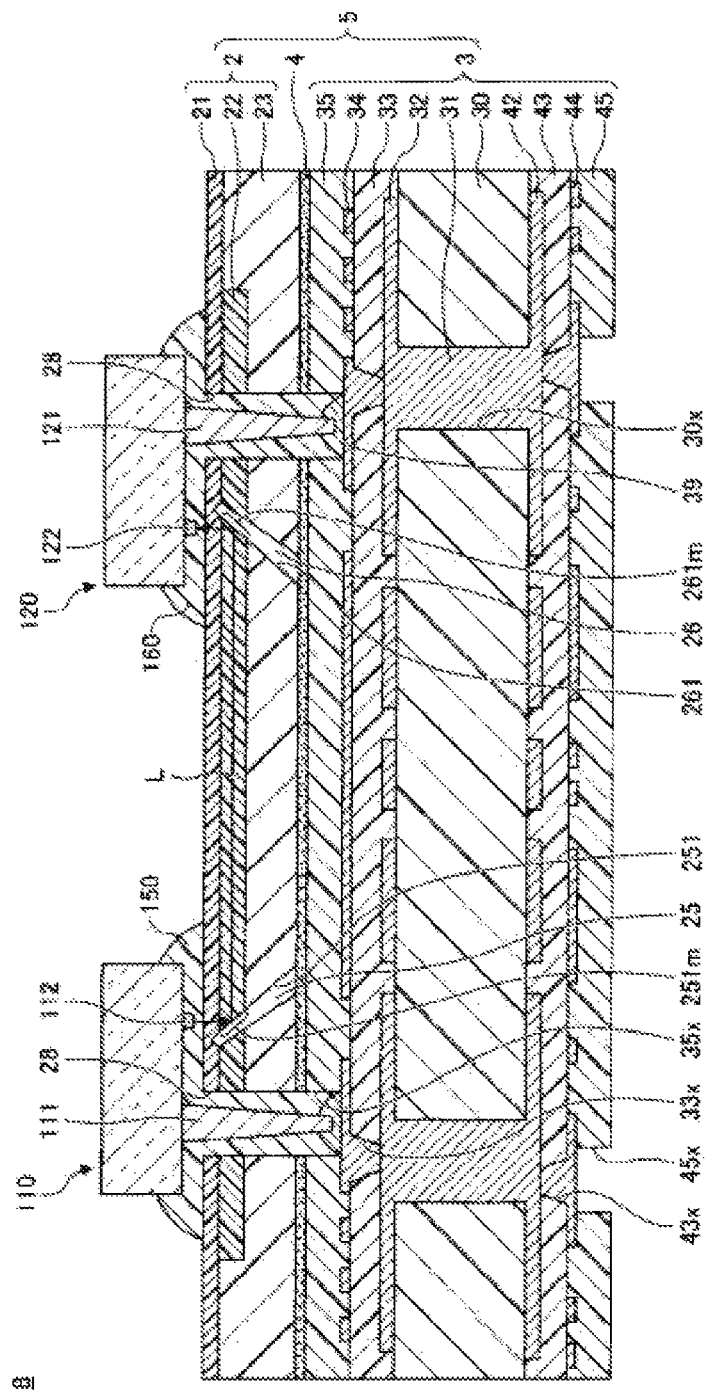
FIG. 8 is a sectional view exemplifying an optical transceiver according to a third exemplary embodiment.

FIG. 8 is a sectional view exemplifying an optical transceiver according to the third exemplary embodiment. Referring to FIG. 8, an optical transceiver 8 includes the optical waveguide mounting substrate 5, a light-emitting element 110, a light-receiving element 120, and under-fill resins 150, 160.

The light-emitting element 110 includes a bump 111 and a light-emitting part 112, and is configured to emit light toward the optical waveguide 2. The bump 111 is an Au bump, for example, is inserted in the opening 35x and the opening 28, and is electrically connected to the external connection terminal 39 exposed in the opening 35x and the opening 28. The light-emitting part 112 is arranged at a position at which the light can be irradiated toward the reflection surface 251m. As the light-emitting element 110, for example, a planar light-emitting laser (VCSEL: Vertical Cavity Surface Emitting Laser), a light-emitting diode (LED), and the like may be used.

The under-fill resin 150 is provided in the opening 35x and the opening 28, and between the light-emitting element 110 and the solder resist layer 35. As the under-fill resin 150, for example, a light-transmittable resin through which the light emitted from the light-emitting element 110 can pass may be used.

The light-receiving element 120 includes a bump 121 and a light-receiving part 122, and the light emitted from the optical waveguide 2 is incident thereon. The bump 121 is, for example, an Au bump, is inserted in the opening 35x and the opening 28, and is electrically connected to the external connection terminal 39 exposed in the opening 35x and the opening 28. The light-receiving part 122 is arranged at a position at which the light reflected on the reflection surface 261m can be received. As the light-receiving element 120, for example, a photo diode, an avalanche photodiode (APD), and the like may be used.

The under-fill resin 160 is provided in the opening 35x and the opening 28, and between the light-receiving element 120 and the solder resist layer 35. As the under-fill resin 160, for example, a light-transmittable resin through which the light to be received by the light-receiving element 120 can pass may be used.

In FIG. 8, the light L emitted from the light-emitting part 112 of the light-emitting element 110 passes through the under-fill resin 150 and the first cladding layer 21, is incident on the core layer 22, reaches the reflection surface 251m, and is totally reflected on the reflection surface 251m, so that a light propagation direction is converted by about 90°. Then, the light is propagated in the core layer 22, reaches the reflection surface 261m, and is totally reflected on the reflection surface 261m, so that the light propagation direction is converted by about 90°. Then, the light is emitted from the core layer 22, passes through the first cladding layer 21 and the under-fill resin 160, and is received by the light-receiving part 122 of the light-receiving element 120.

The reason that the light L is totally reflected on the reflection surfaces 251m, 261m is described. The total reflection indicates a phenomenon that when light is incident on a medium B having a small refractive index from a medium A having a large refractive index, the light is all reflected without passing through a boundary surface between the medium A and the medium B. Also, as is well known as Snell's law, a magnitude of a critical angle (the maximum incidence angle at which the refraction is to occur) is determined by the refractive index. When the light is incident on the medium B (the refractive index N2) from the medium A (the refractive index N1), the total reflection conditions are N1>N2 and θb>θm where the critical angle θm=sin$^{-1}$(N2/N1), and θb is the incidence angle from the medium A onto the medium B.

In FIG. 8, the core layer 22 corresponds to the medium A, and the air in the openings 25, 26 corresponds to the medium B. For example, when the refractive index N1 of the core layer 22 is 1.6 and the refractive index N2 of the air is 1.0, the critical angle θm at the reflection surfaces 251m, 261m is θm=sin$^{-1}$(1.0/1.6)=38°. In this case, when the incidence angle θb is larger than 38°, the light L is totally reflected on the reflection surfaces 251m, 261m.

In the optical transceiver 8, since the openings 25, 26 do not penetrate the first cladding layer 21, the openings are not opened at the mounting side of the light-emitting element 110 and the light-receiving element 120. For this reason, even when a special manufacturing process is not used, the under-fill resins 150, 160 do not enter the openings 25, 26. That is, when mounting the light-emitting element 110 and the light-receiving element 120, it is possible to use a manufacturing process that is the same as a case of mounting a normal semiconductor chip.

Although the preferred exemplary embodiments have been described in detail, the present disclosure is not limited to the exemplary embodiments, and the exemplary embodiments can be diversely modified and replaced without departing from the scope of the claims.

For example, in the exemplary embodiments, the optical waveguide mounting substrate including the light-emitting element and the light-receiving element has been described. However, an optical waveguide mounting substrate including the light-emitting element without the light-receiving element can also be implemented. In this case, a configuration where only the reflection surface 251m for converting the propagation direction of the light incident from the light-emitting element into a direction parallel with the core layer 22 is provided may be possible. Also, an optical waveguide mounting substrate including the light-receiving element without the light-emitting element can also be implemented. In this case, a configuration where only the reflection surface 261m for converting the propagation direction of the light to be propagated in the core layer 22 toward the light-receiving element is provided may be possible.

Also, in the exemplary embodiments, as the wiring substrate 3, the wiring substrate having the core layer and manufactured by the buildup technology has been exemplified. However, as the wiring substrate 3, a coreless wiring substrate manufactured by the buildup technology may also be used. Also, the wiring substrate 3 is not limited thereto, and a variety of wiring substrates may be used. For example, one side (one layer) wiring substrate of which only one surface is formed with a wiring layer, a both-sided (two-layered) wiring substrate of which both surfaces are formed with wiring layers, a through-multi layered wiring substrate where the respective wiring layers are connected by through-vias, an IVH (Interstitial Via Hole) multi-layered wiring substrate where a specific wiring layer is connected by an IVH, and the like may be used.

Also, in the exemplary embodiments, as the opening opened at the second cladding layer-side, penetrating the second cladding layer and the core layer, and closed at the first cladding layer-side, the opening 25, 26 is formed so as to be extended from the second cladding layer 23 to a portion of the first cladding layer 21 while it penetrates the second cladding layer 23 and the core layer 22. However, the opening may be formed so as to be extended from the second cladding layer 23 to the core layer 22 while it penetrates the second cladding layer 23 and the core layer 22 and may not be extended to the portion of the first cladding layer 21. In this case, the surface of the first cladding layer 21 facing the core layer 22 will be a surface which closes the opening.

What is claimed is:

1. An optical waveguide having a support member comprising:
   a support member; and
   an optical waveguide formed on the support member,
   wherein the optical waveguide comprises:
   a first cladding layer formed on a surface of the support member,
   a core layer formed on a surface of the first cladding layer,
   a second cladding layer formed on the surface of the first cladding layer so as to cover a periphery of the core layer and being thicker than the first cladding layer, and
   an opening opened at the second cladding layer-side, penetrating the second cladding layer and the core layer, and closed at the first cladding layer-side, and
   wherein the opening has a first surface and a second surface ranging from the opened side to the closed side, and in a vertical section taken along a longitudinal direction of the core layer, a first angle between a perpendicular line drawn from an opening end of the first surface to the surface of the first cladding layer and the first surface, and a second angle between a perpendicular line drawn from an opening end of the second surface to the surface of the first cladding layer and the second surface are all acute angles, and in the vertical section taken along the longitudinal direction of the core layer, the opening has a wedge-shaped section of which a width gradually decreases from the second cladding layer toward the core layer.

2. The optical waveguide having a support member according to claim 1,
   wherein the first angle is 45°±1°, and a portion of the first surface belonging to the core layer is a reflection surface of light.

3. The optical waveguide having a support member according to claim 1,
   wherein the second angle is 45°±1°, and a portion of the second surface belonging to the core layer is a reflection surface of light.

4. The optical waveguide having a support member according to claim 1,
   wherein an absolute value of a difference between the first angle and the second angle is 14±1°.

* * * * *